(12) United States Patent
Rettie et al.

(10) Patent No.: US 8,790,055 B2
(45) Date of Patent: Jul. 29, 2014

(54) SYSTEM AND METHOD FOR CONDUCTING OPERATIONS TO SUBTERRANEAN FORMATIONS

(75) Inventors: Keith Rettie, Naim (GB); Alan Dyble, Sugar Land, TX (US); Natasha Bortkevich, Westhill (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 780 days.

(21) Appl. No.: 12/870,974

(22) Filed: Aug. 30, 2010

(65) Prior Publication Data

US 2012/0048537 A1 Mar. 1, 2012

(51) Int. Cl.
*B60P 1/64* (2006.01)

(52) U.S. Cl.
USPC .......................................................... 410/44

(58) Field of Classification Search
CPC ............ B60P 1/64; B60P 1/6418; B60P 7/06; B60P 7/08; B60P 7/0807
USPC .......................................................... 410/44
See application file for complete search history.

(56) References Cited

U.S. PATENT DOCUMENTS

| | | | |
|---|---|---|---|
| 2,828,931 A * | 4/1958 | Harvey | 410/46 |
| 4,012,917 A | 3/1977 | Gendron | |
| 4,658,747 A | 4/1987 | Franz et al. | |
| 6,077,004 A * | 6/2000 | Denman, Jr. | 410/8 |
| 6,196,777 B1 * | 3/2001 | Price | 410/102 |
| 6,334,746 B1 * | 1/2002 | Nguyen et al. | 410/44 |
| 6,604,898 B2 * | 8/2003 | Price | 410/102 |
| 7,419,006 B2 | 9/2008 | Armstrong | |
| 7,594,785 B2 * | 9/2009 | Wobben | 410/53 |
| 7,878,742 B2 * | 2/2011 | Wobben | 410/53 |
| 2001/0002973 A1 * | 6/2001 | Price | 410/106 |
| 2002/0159840 A1 | 10/2002 | Bennett, Jr. et al. | |
| 2003/0102166 A1 | 6/2003 | Jortveit | |
| 2007/0224009 A1 * | 9/2007 | Wehrli et al. | 410/44 |

OTHER PUBLICATIONS http://www.offshore-mag.com/articles/print/volume-63/issue-7/departments/vessels-rigsupgrade/schlumberger-launches-stimulation-vessel.html Offshore Magazine, Jul. 1, 2003.*
http://www.oilpubs.com/oso/article.asp?v1=4185 Offshore Shipping Online, Apr. 21, 2000.*
http://www.oilpubs.com/oso/article.asp?v1=3783 Offshore Shipping Online, Dec. 15, 2000.*
International Search Report and Written Opinion issued in PCT/IB2011/053375 on Apr. 4, 2012, 6 pages.
Brochure—DeepSTIM Pronto, Modular, portable, flexible, offshore stimulation equipment, 3 pages total, 2008, Schlumberger.

* cited by examiner

*Primary Examiner* — H Gutman

(57) ABSTRACT

Methods and systems for conducting operations to subterranean formations are provided. The system includes a platform, a grillage mounted on the platform, at least one module for treating the subterranean formation, and a plurality of locks that mechanically engage the grillage with the module. Each lock includes a first plate, a second plate and a connector that connects the first plate and the second plate. The first plate is configured to mechanically engage the grillage, the second plate is configured to mechanically engage the module for treating the subterranean formation.

20 Claims, 9 Drawing Sheets

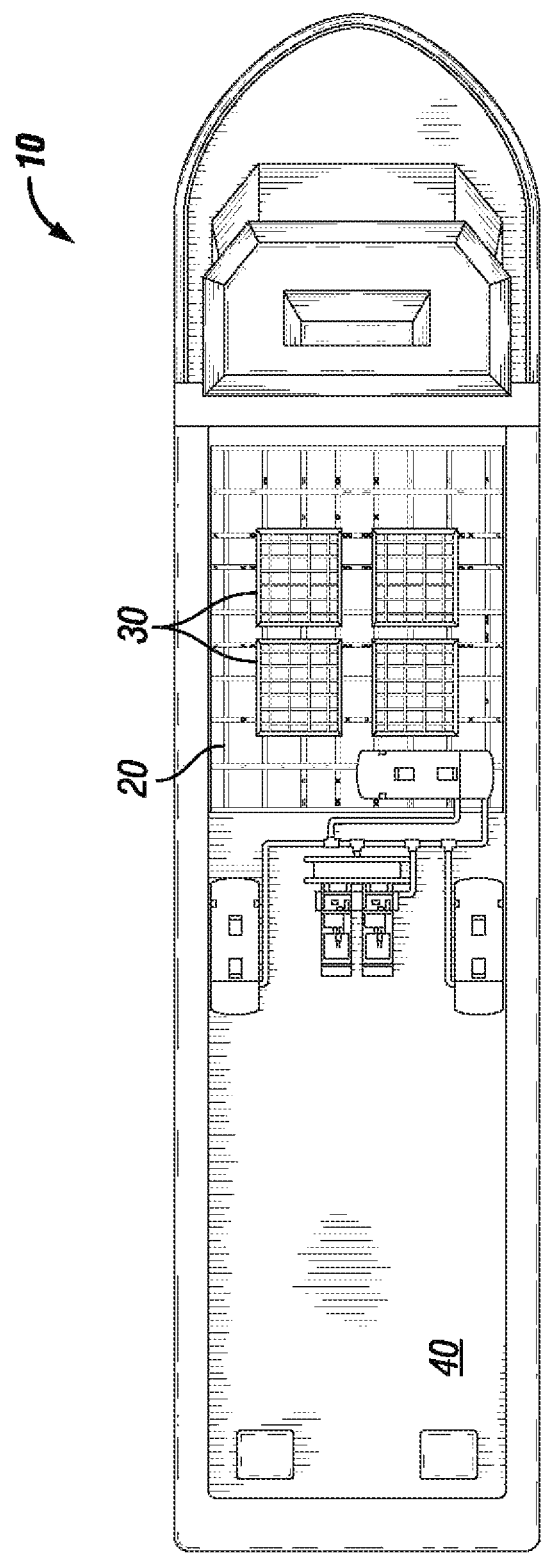

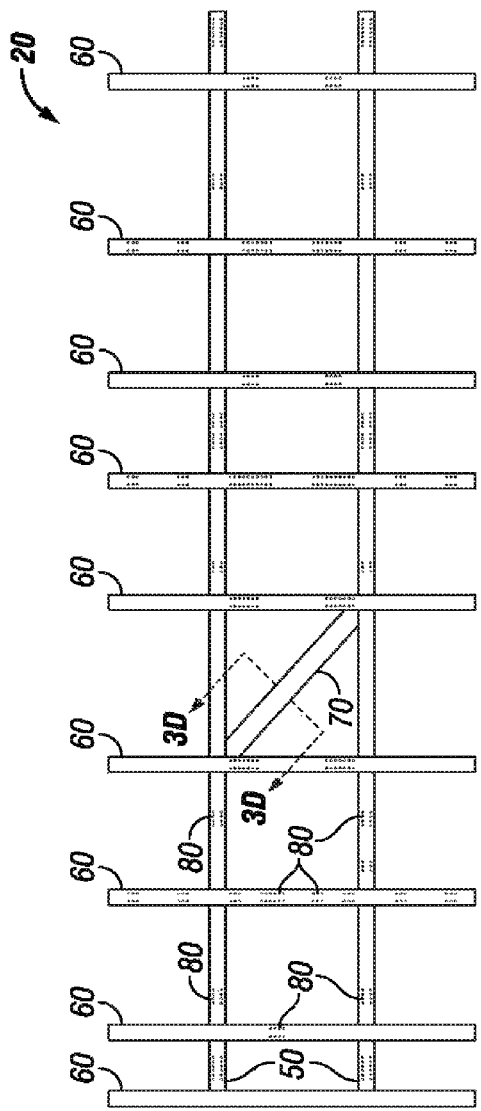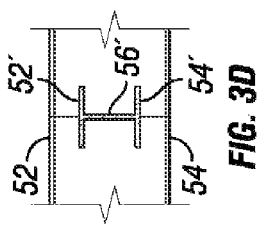
FIG. 3A
FIG. 3B
FIG. 3C
FIG. 3D

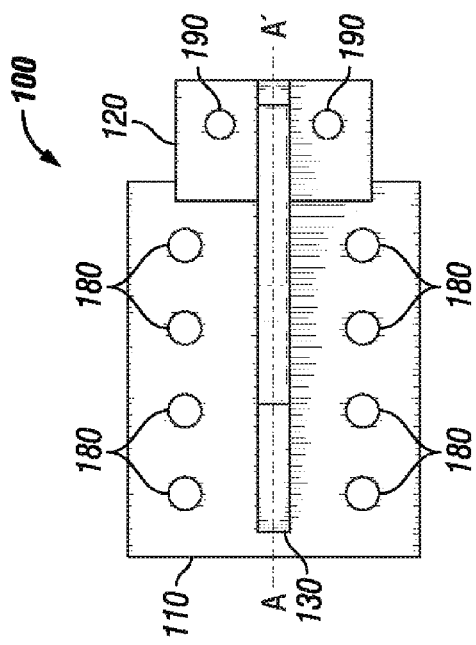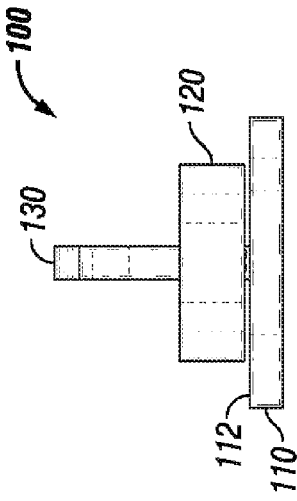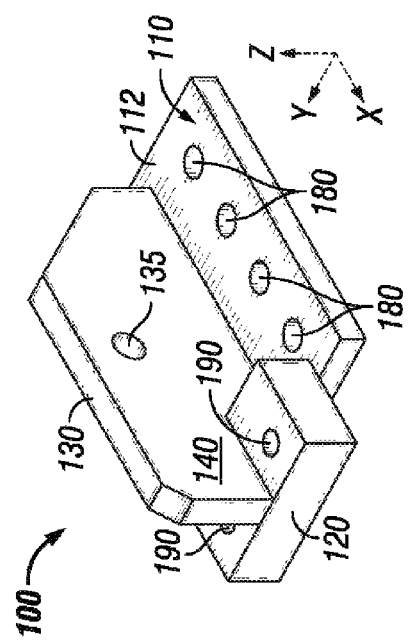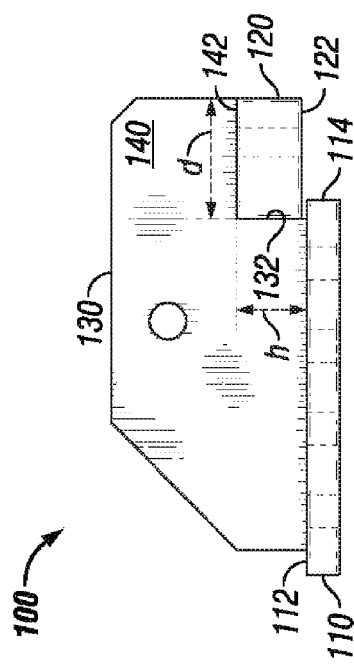
FIG. 4A
FIG. 4B
FIG. 4C
FIG. 4D

SYSTEM AND METHOD FOR CONDUCTING OPERATIONS TO SUBTERRANEAN FORMATIONS

BACKGROUND OF THE INVENTION

The statements in this section merely provide background information related to the present disclosure and may not constitute prior art.

In the oil and gas industry, it is often necessary to deploy a large quantity of dedicated fluids, solids, machines and equipment to locations for conducting operations to subterranean formations. Such operations may include, but are not limited to, drilling, cementing, logging, and stimulating, which may further include acid treatment and high pressure fracturing, etc. For simplicity, in the current application, they are generally referred to as "operations" or "treatments" to subterranean formations.

Because the volume and weight of the materials and equipment are typically quite large, dedicated vessels or trucks are needed to deploy them to the wellsite. The transportation process can be especially challenging when heavy equipment and materials need to be transported to climate-unfriendly regions, such as the North Sea off the coastal line of Norway. Typically, containers and equipment are welded on the deck or a vessel or otherwise permanently affixed to the deck of the vessel to ensure the safety during transportation.

However, this arrangement is not flexible in terms of accommodating different projects required on the wellsite. For example, a high pressure fracturing operation may be followed by an acid stimulation operation. To successfully perform the two operations without substantial delay, two dedicated vessels or trucks are often ordered and deployed at the wellsite. This complicates the logistics of the operations and increases the resource (both human and equipment) needed at the wellsite.

Modular treatment systems have been contemplated. However, due to safety and other concerns, many systems still require a substantial amount of welding to permanently affix the container or equipment on the transportation platform. It may take weeks to convert a vessel or truck from one purpose to another. This application aims to address one or more problems associated with the current system for conducting operations to subterranean formations.

SUMMARY

According to one aspect, there is provided a system for treating a subterranean formation. The system comprises a platform, a grillage mounted on the platform, at least one module for treating the subterranean formation, and a plurality of locks that mechanically engage the grillage with the module. Each lock comprises a first plate, a second plate and a connector that connects the first plate and the second plate. The first plate is configured to mechanically engage the grillage and the second plate is configured to mechanically engage the module for treating the subterranean formation.

According to another aspect, provided a lock that comprises a first plate, a second plate and a connector that connects the first plate and the second plate. The first plate comprises a first through-hole that corresponds to a first opening in a grillage so that a first fastening device can be inserted into the first through-hole and the first opening to mechanically engage the lock and the grillage. The second plate is configured to mechanically engage a module for treating a subterranean formation.

According to a further aspect, there is provided a method of treating a subterranean formation. The method comprises mounting a grillage on a platform, mechanically engaging the grillage with at least one module for treating the subterranean formation by using a plurality of removable locks, deploying the platform to a wellsite, and conducting the treatment of the subterranean formation. Each lock comprises a first plate configured to mechanically engage the grillage, a second plate configured to mechanically engage the module, and a connector that connects the first plate and the second plate.

BRIEF DESCRIPTION OF THE DRAWINGS

These and other features and advantages will be better understood by reference to the following detailed description when considered in conjunction with the accompanying drawings.

FIG. 1 is a schematic representation of a system for treating a subterranean formation according to one embodiment of the current application.

FIGS. 3A-3D depict a schematic representation of the layout of a grillage according to another embodiment of the current application.

FIGS. 4A-4D depict a schematic representation of a lock according to one embodiment of the current application.

FIGS. 8A-8D depict a schematic representation of a lock according to another embodiment of the current application.

DETAILED DESCRIPTION OF SOME ILLUSTRATIVE EMBODIMENTS

Figure 2A:
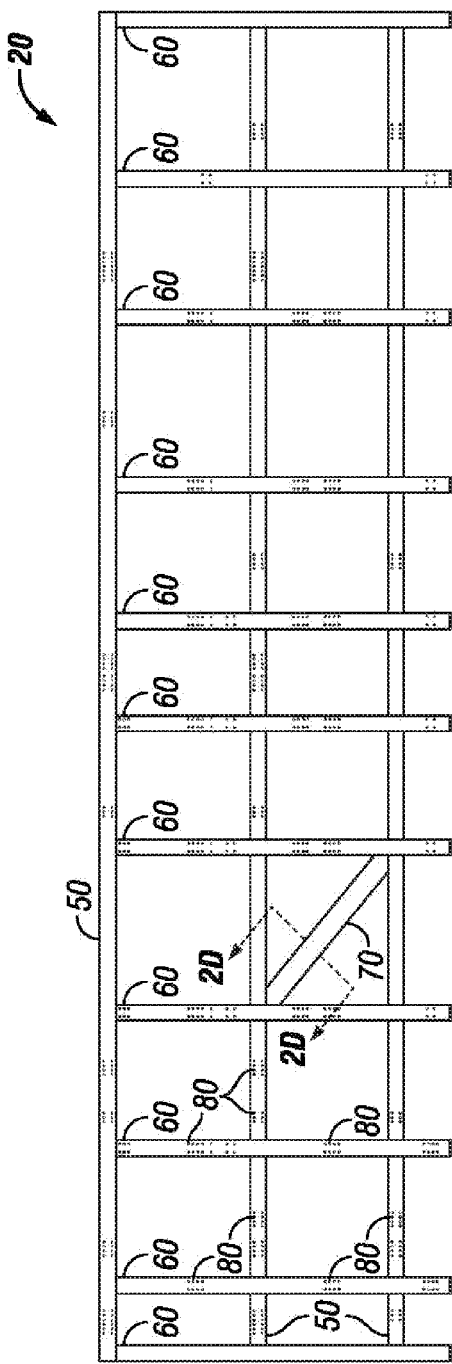
FIGS. 2A-2D depict a schematic representation of the layout of a grillage according to another embodiment of the current application.
Figure 2B:
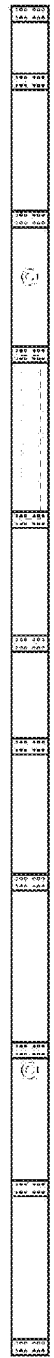

Some embodiments relate generally to systems and methods for treating a subterranean formation.

According to one embodiment, FIG. 1 shows a vessel 10 for treating an offshore subterranean formation. The vessel comprises a deck 40, a grillage 20 mounted on the deck 40, and at least one module 30 for treating the subterranean formation. The grillage 20 can be welded to the deck 40 of the vessel 10 or otherwise secured to the deck. In some cases, the grillage is permanently affixed to the deck 40 of the vessel 10. In some other cases, the grillage is removably attached to the deck 40 of the vessel 10.

The layout of the grillage 20 can take various forms. FIGS. 2A-2D and FIGS. 3A-3D show two exemplary embodiments of the grillage 20. As depicted, a plurality of beams 50 and crossbeams 60 are interconnected together to form a network. In one embodiment, the beams 50 are essentially perpendicular to the crossbeams 60. In other embodiments, the beams 50 and the crossbeams 60 are connected at an angle that is substantially different from 90°. To increase the overall strength and integrity of the grillage 20, diagonal bars 70 can be optionally inserted into the network.

Figure 2D:
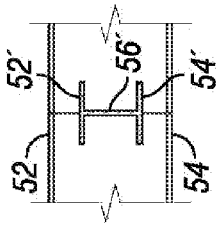
Figure 2C:
Figure 5A:
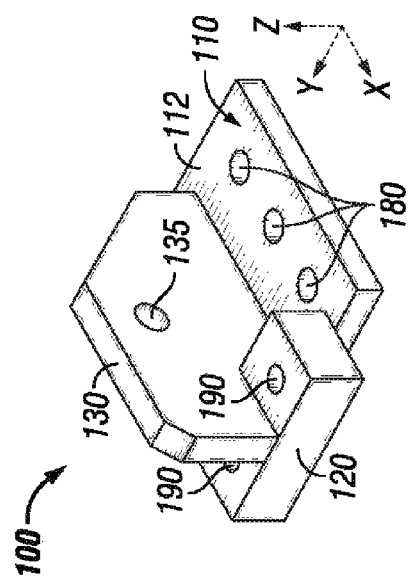
FIGS. 5A-5D depict a schematic representation of a lock according to another embodiment of the current application.
Figure 5B:
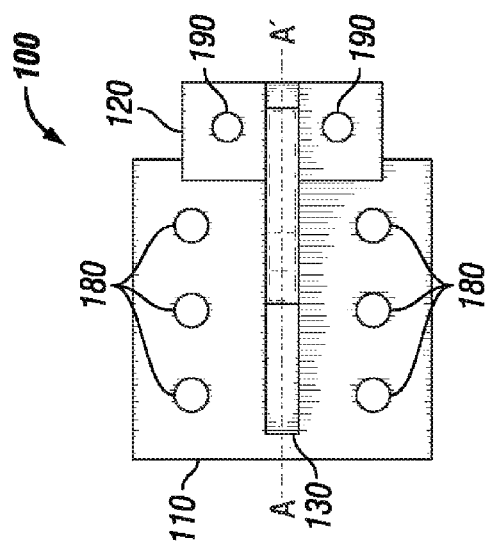
Figure 5C:
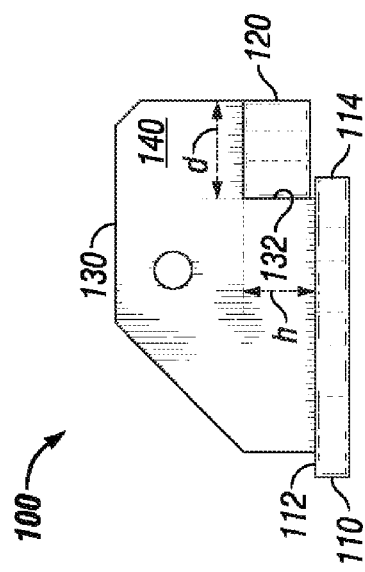
Figure 5D:
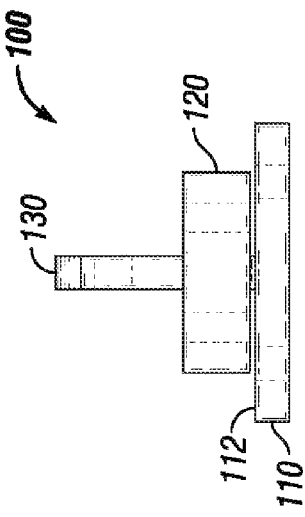
Figure 6A:
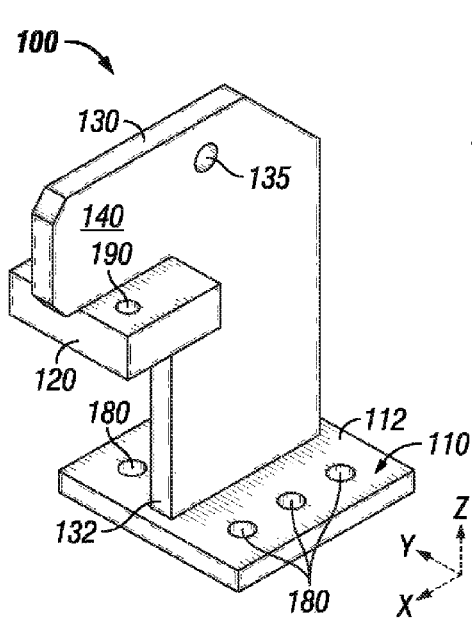
FIGS. 6A-6D depict a schematic representation of a lock according to another embodiment of the current application.
Figure 6B:
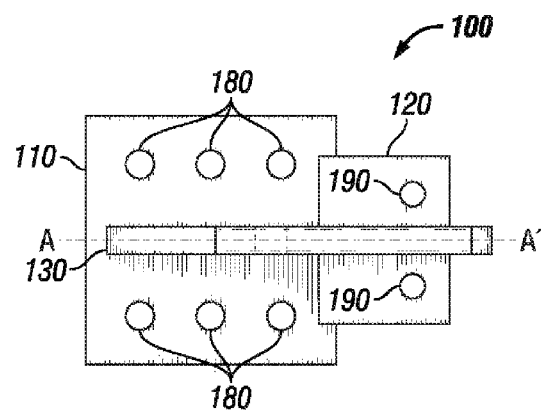
Figure 6C:
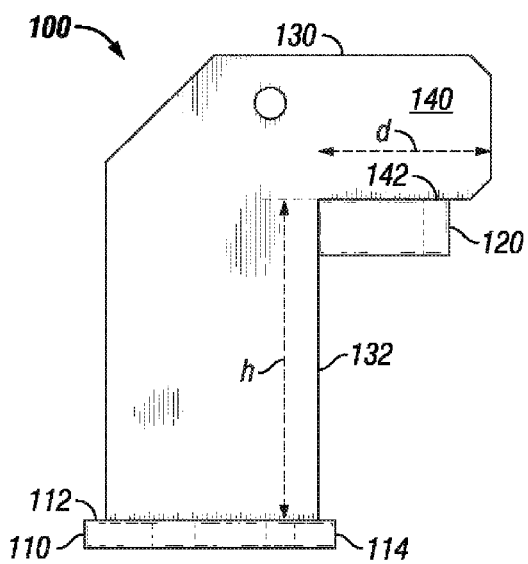
Figure 6D:
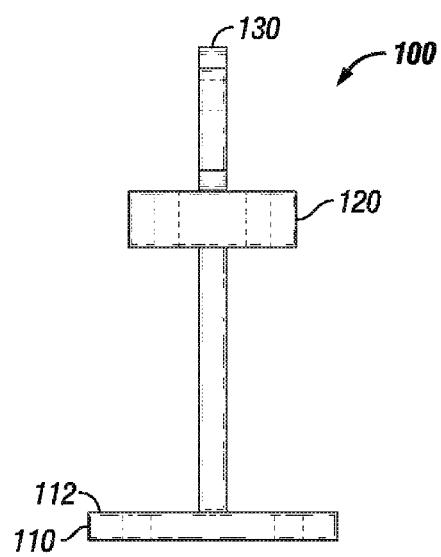
Figure 7A:
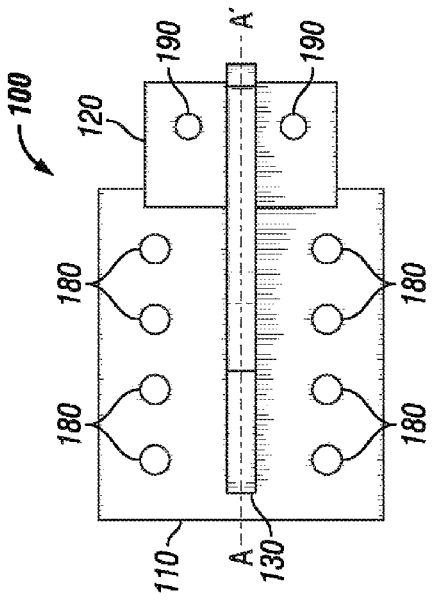
FIGS. 7A-7D depict a schematic representation of a lock according to another embodiment of the current application.
Figure 7B:
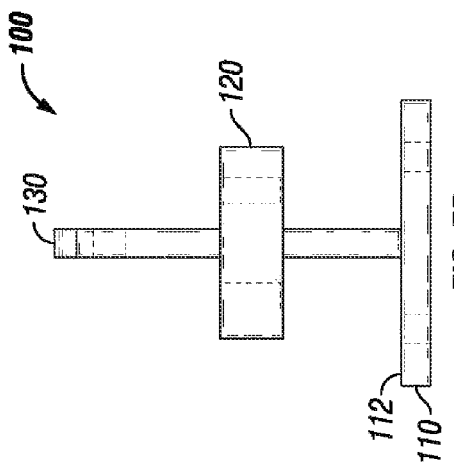
Figure 7C:
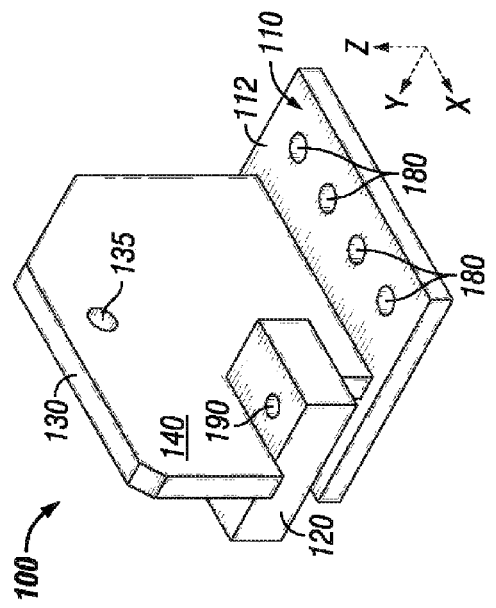
Figure 7D:
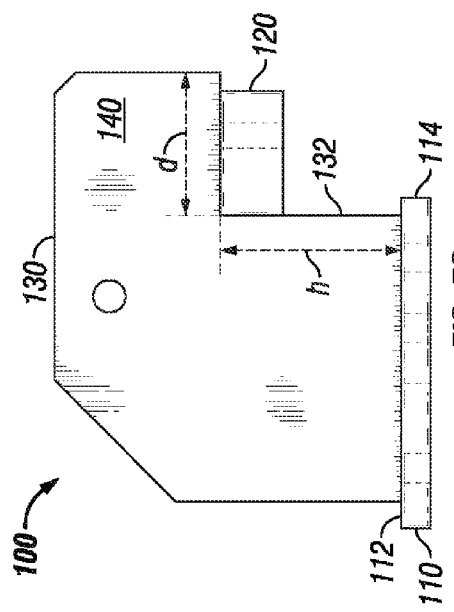

The cross-section of the beam 50, crossbeam 60, and the diagonal bar 70 can be of any shape. In one embodiment, as shown in FIG. 2D and FIG. 3D, the cross-section of the beam 50, crossbeam 60, and the diagonal bar 70 is in the shape of an "I" bar. That is, the beam 50, crossbeam 60, or the diagonal bar 70 has a horizontally disposed top plate 52, 52', a horizontally disposed bottom plate 54, 54', and a vertically disposed connection bar 56' that connects the top plate 52, 52' and the bottom plate 54, 54'. In some embodiments, the height of the cross-section of the diagonal bar 70 is small than the height of the cross-section of the beam 50 and crossbeam 60. In one case, the height of the cross-section of the diagonal bar 70 is approximately a half of the height of the cross-section of the beam 50 and crossbeam 60.

The distance between every two adjacent beams 50 (or two adjacent crossbeams 60) can be equal over the entire span of the grillage 20. Alternatively, different distances can be adopted at different sections of the grillage 20. For example, the boarder sections of the grillage 20 can be equipped with more beams 50 (and/or crossbeams 60) so that a narrowerly-spaced network can be constructed. Therefore, when different sized containers/machines are positioned on the grillage 20, they can be aligned first with a beam 50 and/or a crossbeam 60 in the center section of the grillage 20 and then aligned with a beam 50 and/or a crossbeam 60 in the boarder sections of the grillage 20. Because there are more beams 50 and/or crossbeams 60 in the boarder sections, it is more likely to locate a beam 50 and/or a crossbeam 60 in the boarder sections of the grillage 20 than in the center section of the grillage 20. Variations to the above described grillage layout are possible. For example, there can be multiple narrowly-spaced regions and broadly-spaced regions alternatively disposed from one end of the grillage 20 to the other side of the grillage 20. All such variations are within the scope of the current application.

In some embodiments, the beams 50, crossbeams 60, and the diagonal bars 70 are welded together or otherwise permanently connected together to form a permanent network. In some other embodiments, the beams 50, crossbeams 60, and the diagonal bars 70 are removably connected together to form a temporary network, which can be dissembled into pieces after use. In some further embodiments, some beams 50, crossbeams 60, and/or the diagonal bars 70 are welded together or otherwise permanently connected together to form a permanent network, and some other beams 50, crossbeams 60, and/or the diagonal bars 70 are removably connected to the permanent network so that they can be removed from the permanent network depending on the specific requirement of an operation. Additional beams 50, crossbeams 60, and/or the diagonal bars 70 can be removably added to the grillage 20 as well.

As depicted in FIGS. 2A-2D and FIGS. 3A-3D, the top surfaces 52 of the beams 50 and crossbeams 60 can be equipped with a plurality of first openings 80 that are configured to receive first fastening devices 150, such as bolts or screws, to secure locks 100 (to be discussed in more details below) on the top plate 52 of the beam 50 or the crossbeam 60.

Referring now to FIGS. 4A-4D, 5A-5D, 6A-6D and 7A-7D, several examples of locks 100 are depicted to illustrate the embodiments of the current application. However, it should be understood that locks with different shapes or dimensions can be adopted by people skilled in the art after reviewing the current application. Such variations are within the scope of the current application.

In FIGS. 4A-4D, 5A-5D, 6A-6D and 7A-7D, locks according to embodiments of the current application are generally indicated at 100. The lock 100 comprises a first plate 110, a second plate 120, and a connector 130 that connects the first plate 110 and the second plate 120. The first plate 110 comprises a first through-hole 180 or a plurality of first through-holes 180. The second plate 120 comprises a second through-hole 190 or a plurality of second through-holes 190. The connector 130 comprises a third through-hole 135 or a plurality of third through-holes 135. In the depicted embodiments, the connector 130 is shown in the shape of a plate; however it should be understood that other shapes can be employed as well.

In some embodiments, the connector 130 is disposed on a top surface 112 of the first plate 110, and is substantially vertical in reference to the first plate 110. The connector 130 has a protrusion 140 that extends from a side surface 132 of the connector 130 in a direction "x" that is substantially parallel to the plane where the first plate 110 occupies. The protrusion 140 takes place at a height "h" from the top surface of the first plate 110 and expands a distance "d" off the side surface 132 of the connector 130. In some embodiments, the height "h" is at least slightly larger than the thickness of the second plate 120, so that when the second plate 120 is connected to the bottom surface 142 of the protrusion 140, the bottom surface 122 of the second plate 120 is at least slightly higher than the top surface of the first plate 110. In some embodiments, the distance "d" is the same as or slightly larger than the width of the second plate 120, so that from a side view (FIGS. 4C, 5C, 6C, 7C), the second plate 120 is located substantially underneath the protrusion 140.

Moreover, in some embodiments, the side surface 114 of the first plate 110 is only slightly outside of the side surface 132 of the connector 130, best seen in FIGS. 4C, 5C, 6C, 7C. Therefore, due to span of the protrusion 140 (distance "d" in FIGS. 4C, 5C, 6C, 7C), the second plate 120 is substantially offset from the first plate 110 when the lock is viewed from the top, as illustrated in FIGS. 4B, 5B, 6B, 7B.

Referring now to FIGS. 4B, 5B, 6B, 7B showing the top view of the lock 100, according to some embodiments, the connector 130 is disposed along a center line A-A' of the first plate 110 and the second plate 120. In some other embodiments, the connector 130 is disposed off the center line A-A' of the first plate 110 and the second plate 120. In some further embodiments, more than one connector is disposed on the top surface 112 of the first plate 110 and connects the second plate 120 via protrusions 140.

In FIGS. 4B, 5B, 6B, 7B, according to one embodiment, two sets of first through-holes 180 are provided on the first plates 110, one set on each side of the connector 130. The first through-holes 180 in each set are arranged in a linear fashion with equal distance between each two adjacent first through-holes 180. However, it should be understood that other arrangements of the first through-holes are also possible. Similarly, in the depicted embodiments, two second through-holes 190 are provided on the second plate 120, one on each side of the connector 130 with equal distance from the connector 130. It should be understood that other arrangements of the second through-holes are also possible.

Figure 8A:
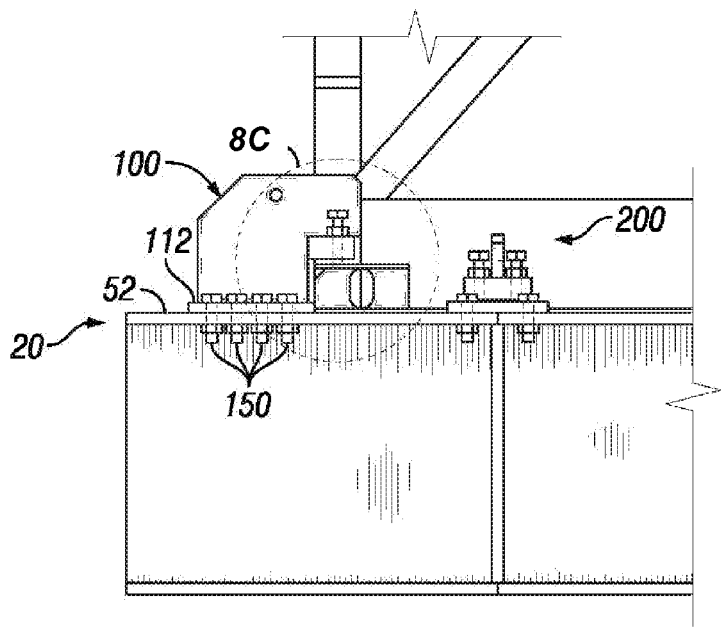
Figure 8B:
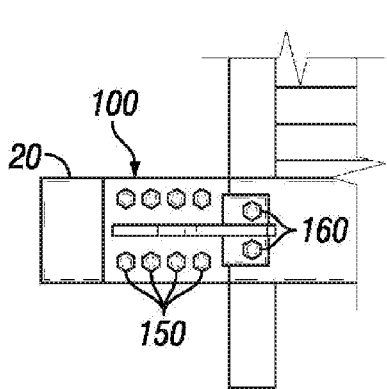
Figure 8C:
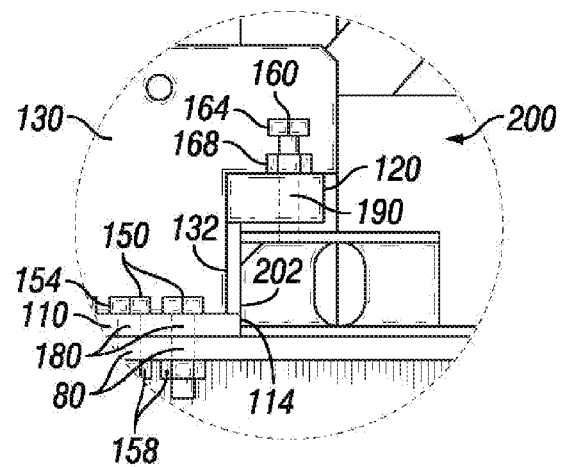
Figure 9A:
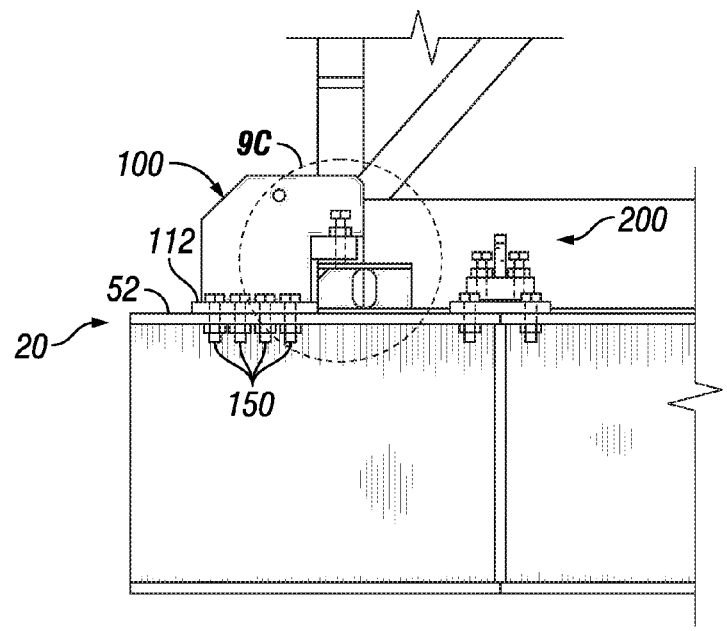
FIGS. 9A-9C depict a schematic representation of a system for treating a subterranean formation according to one embodiment of the current application, with more detailed showing of the assembly where the lock is mechanically engaged with the grillage and the module.
Figure 9B:
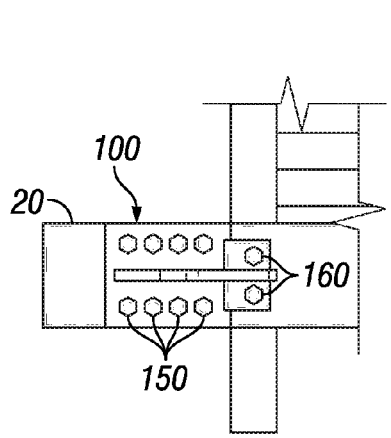
Figure 9C:
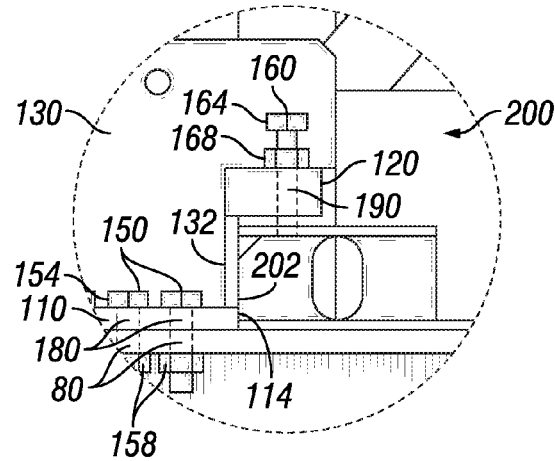

Referring now to FIGS. 8A-8C, according to one embodiment, a system for treating a subterranean formation is depicted. In this embodiment, a grillage 20 is mechanically engaged with a module 200 for treating the subterranean formation by a lock 100. The lock 100 comprises a first plate 110, a second plate 120, and a connector 130 that connects the first plate 110 and the second plate 120. The first plate 110 comprises a first through-hole 180 that corresponds to a first opening 80 in the grillage 20 so that a first fastening device 150 can be inserted into the first through-hole 180 and the first opening 80 to mechanically engage the lock 100 and the grillage 20.

The second plate 120 is configured to mechanically engage a module 200 for treating the subterranean formation. In one embodiment, the second plate 120 is in direct contact with a surface of the module 200. In another embodiment, the second plate 120 comprises a second through-hole 190 which corresponds to a second opening (not shown) on the module 200 so that a second fastening device 160 can be inserted into the second through-hole 190 and the second opening to mechanically engage the lock 100 and the module 200. In yet another embodiment, the second plate 120 comprises a second through-hole 190 through which a second fastening device 160 can be inserted and then exert mechanical and/or frictional forces directly on the module 120.

To increase the stability of the assembly, in some cases, a side surface 202 of the module 200 is in direct contact with at least one of a side surface 114 of the first plate 110 and a side surface 132 of the connector 130.

The fastening devices 150, 160 can be a bolt and a nut, a screw, a threaded rod, or any other mechanism that can engage two structures by mechanical and/or frictional forces. The first through-hole 180, the first opening 80, the second through-hole 190, and the second opening (not shown) may optionally have threaded internal surfaces or other mechanism that can mechanically engage the fastening devices 150, 160.

In the depicted embodiment in FIGS. 8A-8C, the first fastening device 150 is in the form of a bolt 154 and a nut 158, wherein the bolt 154 is first inserted into the first through-hole 180 of the first plate 110, through the first opening 80 of the grillage 20, and tightened by nut 158 located on the bottom side of the top plate 52 of the grillage 20. Variations to this embodiment are possible and are within the scope of the current application.

As depicted in FIGS. 8A-8C, the second fastening device 160 is in the form of a bolt 164 and a tightening nut 168. In one embodiment, the internal surface of the second through-hole 190 and the second opening (not shown) have threaded internal surfaces or other mechanism that can mechanically engage the second fastening device 160. The external surface of the second fastening device 160 is also threaded or otherwise configured to mechanically engage the tightening nut 168. Therefore, once the second fastening device 160 has advanced to a desired location, the fastening device 160 can be lowered to the top surface of the second plate 120 so as to hold the second fastening device 160 in place. Variations to this embodiment are possible and are within the scope of the current application.

Typically, a plurality of locks is used in a subterranean formation treatment system such as vessel 10 as shown in FIG. 1 above. However, situations may justify the use of only one lock on a particular vessel 10.

It should be understood that although the above descriptions are provided in the context of a vessel for offshore operations, the transportation platform 40 can be in any form perceivably by people skilled in the art in view of the teachings of the current application. In some embodiments, the platform 40 is a deck or a portion of a deck of a ship, vessel, or a towboat. In some other embodiments, the platform 40 is a chassis of a road legal truck. In some additional embodiments, the platform 40 is a flatbed that can be lifted and mounted on a transportation means, such as a truck, a trailer, a ship, a vessel, or a towboat, etc. Variations to the form of the transportable platform 40 are within the disclosure of the current application.

The preceding description has been presented with reference to some illustrative embodiments of the Inventors' concept. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

We claim:

1. A system for treating a subterranean formation, the system comprising:
a platform;
a grillage mounted on the platform;
a module for treating the subterranean formation; and
a lock that comprises a first plate, a second plate that comprises a bottom surface, and a connector that connects the first plate and the second plate such that the second plate is substantially offset from the first plate when the lock is viewed from above,
wherein when the first plate mechanically engages the grillage and the second plate mechanically engages the module, a portion of the module contacts the grillage at a position beneath the second plate.

2. The system of claim 1, wherein the first plate comprises a through-hole that corresponds to an opening in the grillage, the system further comprising a fastening device inserted into the through-hole and the opening to mechanically engage the lock and the grillage.

3. The system of claim 1, wherein the second plate comprises a through-hole that corresponds to an opening in the module, the system further comprising a fastening device inserted into the second through-hole and the second opening to mechanically engage the lock and the module.

4. The system of claim 1, wherein the second plate comprises a through-hole through which a fastening device can be inserted and exert mechanical forces on the module.

5. The system of claim 1, wherein when the first plate mechanically engages the grillage and the second plate mechanically engages the module, the module contacts at least one of a side surface of the first plate and a side surface of the connector.

6. The system of claim 1, wherein a bottom surface of the second plate is in direct contact with the module when the first plate mechanically engages the grillage.

7. The system of claim 1, wherein the platform is a deck of a vessel or a chassis of a truck.

8. The system of claim 1, wherein the module further comprises a skid that the second plate engages.

9. The system of claim 1, wherein the module is a solid bulk container, a liquid container, a machine or equipment, a winch of wireline, or a reel of coiled tubing.

10. A lock comprising:
a first plate
that comprises a through-hole that corresponds to an opening in a grillage so that a fastening device can be inserted into the through-hole and the opening to mechanically engage the lock and the grillage;
a second plate that comprises a bottom surface that is configured to directly contact a module for treating a subterranean formation; and
a connector that extends upwardly from the first plate and comprises a protrusion,
wherein the second plate is located substantially underneath the protrusion of the connector, and wherein the connector connects the first plate to the second plate such that the second plate is substantially offset from the first plate when the lock is viewed from above.

11. The lock of claim 10, wherein the second plate comprises a through-hole that corresponds to an opening in the module for treating a subterranean formation so that a fastening device can be inserted into the through-hole and the opening to mechanically engage the lock and the module.

12. The lock of claim 10, wherein the second plate comprises a through-hole through which a fastening device can be inserted and exert mechanical forces on the module.

13. The lock of claim 10, wherein the first plate and the second plate are substantially parallel to each other.

14. The lock of claim 10, wherein the connector is substantially vertical in reference to either the first plate or the second plate.

15. A method of using a system for treating a subterranean formation, the method comprising:
 positioning a module for treating the subterranean formation relative to a grillage that is mounted on a platform; and
 mechanically engaging the grillage with the module via a removable lock that comprises a first plate a second plate, and a connector that connects the first plate and the second plate such that the second plate is substantially offset from the first plate when the lock is viewed from above,
 wherein the mechanically engaging the grillage with the module via the removable lock comprises mechanically engaging the first plate with the grillage and comprises mechanically engaging the second plate with the module such that a portion of the module contacts the grillage at a position beneath the second plate.

16. The method of claim 15, wherein the mechanically engaging the grillage with the module via the removable lock comprises inserting a fastening device into a through-hole on the first plate and into an opening on the grillage.

17. The method of claim 15, wherein the mechanically engaging the grillage with the module via the removable lock comprises inserting a second fastening device into a through-hole on the second plate into an opening on the module.

18. The method of claim 15, wherein the mechanically engaging the grillage with the module via the removable lock comprises inserting a fastening device into a through-hole on the second plate and exerting mechanical forces on the module.

19. The method of claim 15, wherein the mechanically engaging the grillage with the module via the removable lock comprises contacting the module with at least one of a side surface of the first plate and a side surface of the connector.

20. The method of claim 15, wherein the mechanically engaging the grillage with the module via the removable lock comprises placing a bottom surface of the second plate in direct contact with the module.

* * * * *